Figure 1:
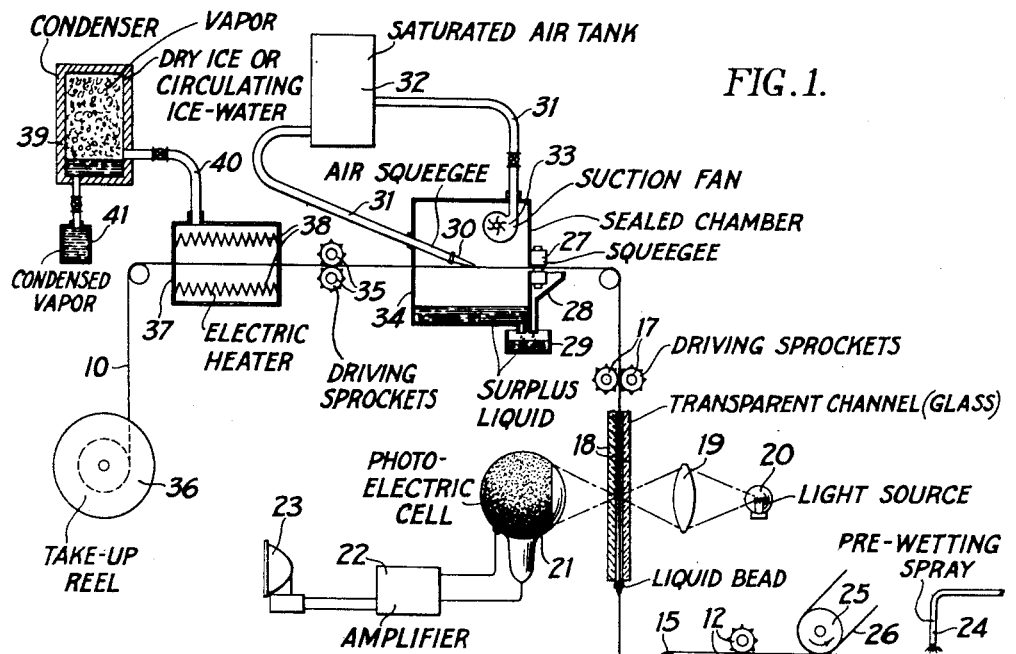

March 11, 1941.  K. C. D. HICKMAN  2,234,697

METHOD AND APPARATUS FOR OPTICAL SCANNING

Filed Aug. 11, 1939

KENNETH C. D. HICKMAN
INVENTOR

BY Newton M. Perrins
Rolla N. Carter
ATTORNEYS

Patented Mar. 11, 1941

2,234,697

UNITED STATES PATENT OFFICE 2,234,697

METHOD AND APPARATUS FOR OPTICAL SCANNING

Kenneth C. D. Hickman, Rochester, N. Y., assignor to Eastman Kodak Company, Rochester, N. Y., a corporation of New Jersey Application August 11, 1939, Serial No. 289,643

5 Claims. (Cl. 179—100.3)

The present invention relates to optical scanning and more particularly to the temporary elimination of surface imperfections and irregularities in a transparent record being reproduced with the aid of light.

It is well known that surface imperfections and irregularities of a transparent material can be rendered invisible and optically ineffective by immersion in a liquid of suitable refractive index and this principle has been used in many forms, including the projection of transparent picture records and the reproduction of photographic sound records.

The primary object of the present invention is to provide a method and apparatus whereby a record at the reproducing or scanning point will be immersed in a suitable liquid in a simple and compact manner.

Another object of the invention is to provide a method suitable for commercial use in sound reproduction.

Other objects and advantages of the invention will appear from the following description when read in connection with the accompanying drawing and its scope will be pointed out in the appended claims.

In the drawing—

Figure 2:
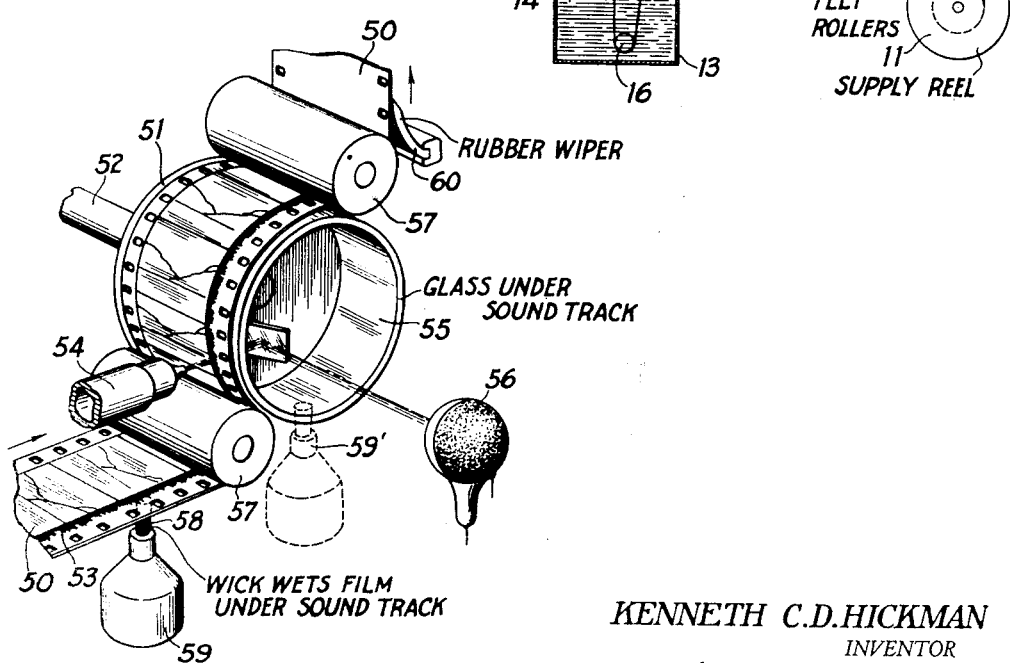

Fig. 1 shows schematically a sound reproducing system incorporating the invention, and Fig. 2 shows in perspective another embodiment incorporating the invention.

In order that the several steps of the method and the apparatus employed may be clearly understood, the arrangement in Fig. 1 is shown schematically with all unessential parts omitted. In this arrangement, the transparent record to be reproduced and which, in this instance, is assumed to be a photographic sound record provided on a support 10 is unwound from a suitable supply reel 11 by driving sprockets 12, and introduced into a container 13 filled with a liquid 14, which may be any suitable liquid having a refractive index substantially equal to that of the record support. Suitable rollers 15 and 16 are provided for directing the film 10 into the liquid 14, from which the film 10 is withdrawn by a second set of driving sprockets 17. Between the bath 14 and the sprockets 17, a shallow channel or rectangular tunnel is provided, having transparent walls 18, between which the film 10 is adapted to pass and which are arranged parallel to the film surface. The film 10, emerging from the bath 14 at the speed normal for sound reproduction, drags liquid from the bath 14 into the channel 18, and I have found that when this channel is approximately one-tenth of an inch in width, a perfect bead of liquid is supplied which fills completely the spaces between the walls 18 and the film 10, to give the required optical contact between the film 10 and the glass surfaces.

With the channel comprised of the walls 18 completely filled with liquid, imperfections and irregularities in the surface of the record support 10 are optically removed, as is well known, and since the outer surfaces of the channel members 18 are parallel, the sound record may be scanned while passing through this channel without such imperfections and irregularities affecting the reproduction. Such scanning for reproduction purposes may be accomplished as desired and is shown as comprising a lens 19 for concentrating light coming from a source 20, onto the film 10, and the transmitted light, as modulated by the sound record, is received by a photo-electric cell 21, the output of which passes through an amplifier 22 to a translating device 23, which may be a loud speaker.

For obvious reasons, it will be desirable to have the liquid bath 14 quite small, and in order to delay pollution of this bath with dirt or other foreign matter brought in by the film, I prefer to provide a pre-wetting bath, such as provided by a spray pipe 24. Between this pre-wetting bath, which obviously may be supplied to both surfaces of the film 10, and the immersion bath 14, a pair of rollers 25 are provided for scrubbing the film 10, such as by moving felt bands 26 in contact with the film 10 and in a direction opposite to the travel of the film 10.

With the arrangement just described, the film 10, bearing the sound record to be reproduced, is wetted, scrubbed, immersed in a liquid bath, and then passed through the scanning beam in the order named.

The film 10, after leaving the scanning channel 18, will still carry on its surfaces a considerable amount of liquid and, manifestly, the vapors from this liquid would be objectionable in any projection booth. An obvious remedy would be to provide a drying cabinet and a suction fan to withdraw the fumes to a place of safety. However, in order to avoid the waste of relatively expensive liquid, I prefer to apply a mechanical squeegee 27 with a cooperating drain 28 for directing the wiped off fluid into a suitable tank 29 for surplus liquid. For removing the liquid remaining after the action of the mechanical squeegee 27, I propose to provide an air squeegee 30 which is shown as applied to the upper surface of the film 10, but which obviously may be applied to both surfaces. The air squeegee 30 is rendered more efficient by employing air which has been saturated with the vapor of the liquid to be removed, and for this purpose, the pipe 31 supplying the squeegee 30 is passed through a saturated air tank 32. Again for conserving fluid, the air pressure for the squeegee 30 is provided by a fan 33 positioned within a closed compartment 34 which surrounds the air squeegee 30 and which also serves for collecting the surplus liquid removed by this squeegee. A third pair of driving sprockets 35 may be provided for pulling the film 10 past the mechanical squeegee 27 and the air squeegee 30, and from these sprockets 35, the film 10 is wound up on a suitable take-up reel 36. After the preliminary drying of the film by the squeegees 27 and 30, it may be desirable to complete the drying and for this purpose the film 10 is passed through a short drying box or cabinet 37 which may be heated in any well known manner, as by electric coils 38. If the vapors from this cabinet 37 are found to be excessive, they may be condensed by the use of cold water or ice. For this purpose a condenser 39, communicating with the heating chamber 37 by means of a pipe 40, is provided. This condenser may be cooled in any well-known manner, not shown, and the condensed vapor drawn off into a suitable reservoir 41.

With the apparatus described in connection with Fig. 1, the film 10 is wetted by passing through a liquid bath, and the liquid carried by the film as it emerges from the bath furnishes the supply for a capillary channel having parallel, transparent side walls at the scanning point for the record. These transparent side walls serve the purpose of making plano the surface of the liquid coating on the film so that there are no optical irregularities or imperfections to impair the modulations introduced into the scanning beam by the sound record.

In the modification shown in Fig. 2, a simplified arrangement is employed for eliminating any optical effect from imperfections or irregularities occurring on one side of a transparent film to be reproduced. In this embodiment, the film 50, carrying the photographic sound record to be reproduced, is passed over a drum 51, carried by a shaft 52. At least the portion of the drum 51 underlying the sound track 53 of the film 50 is made of some transparent material, such as glass, so that the scanning beam, directed through the film by an objective 54, may be directed by a suitable reflector 55 onto a photoelectric cell 56. The film 50 may be held in intimate contact with the drum surface of the drum 51 by means of pressure rollers 57. In accordance with the present invention, a liquid is applied to the surface of the film 50 which comes in contact with the drum 51 so that while it is passing over the surface of the drum, any imperfections or irregularities appearing on this surface of the film 50 are optically eliminated in the same way that they were eliminated by the capillary channel in Fig. 1. The liquid coating to the film may be applied in any suitable manner and is here shown as being applied by a wick 58, immersed in the coating liquid, which may be carried in a suitable container 59. Since the function of this wetting or coating is to provide, in effect, a continuous optical medium, by the elimination of air surfaces between the film and the transparent drum, the liquid may be applied to the outer surface of the drum at some point before the film is entrained on the drum. This alternative arrangement is indicated by the wick and container 59', shown in broken lines. As the film 50 leaves the drum 51, the excess liquid is removed in any suitable manner, as by a rubber wiper 60.

In each of the arrangements shown in Figs. 1 and 2, optical imperfections in a record support are temporarily removed by rendering the support optically smooth. Also, in each case the liquid coating on the film as it passes through the scanning position is rendered substantially plano to eliminate any possibility of irregularities in the surface of the liquid impairing the quality of the reproduction.

Although I have illustrated my invention as embodied in two specific apparatus, it will be obvious to those skilled in the art that the method of my invention and apparatus for practicing the same may take other forms without departing from the spirit of my invention, the scope of which is pointed out in the appended claims.

What I claim as new and desire to secure by Letters Patent of the United States is:

1. Apparatus for temporarily providing a moving photographic film with optically smooth surfaces as it passes a reproducing station, comprising a capillary channel having transparent side walls positioned at the reproducing station, a container, a liquid in the container having a refractive index substantially equal to that of said film, and means for advancing the film serially through the liquid and said channel, whereby liquid adhering to the film is carried into said channel to fill completely the spaces between the film and the transparent side walls of said channel.

2. Apparatus for providing a sound record film with a liquid coating as it passes a scanning point, comprising means for advancing the film through a scanning position, means for applying an adhering layer of liquid to the film as it approaches the scanning position, and plano transparent plates spaced on opposite sides of the film path at the scanning position, said plates being positioned close enough to the film path so that the liquid carried by the film will accumulate in and fill completely the spaces between the film and said plates.

3. In a process for temporarily supplying a liquid coating to a photographic sound record film as it passes a reproducing point, the method which comprises applying a coating of liquid to at least one surface of the film as it approaches the point of reproduction and contacting the surface of the liquid on the film with a smooth surface of a solid transparent body during the passage of the film past the reproducing point, whereby a substantially uniform layer of the liquid covers the film at the reproducing point.

4. In a process for improving the photo-electric reproduction of a transparent photographic record film by optically removing during reproduction, surface irregularities, the method which comprises coating the film with a liquid having a refractive index substantially equal to that of the film, moving the film past the reproduction point, and mechanically making plano the surface of said coating while the film is passing the point of reproduction.

5. In a sound head, means for providing a light beam, means for advancing a sound record film through said beam, a transparent member for supporting the film during its passage through said beam, and means for applying a thin coating of liquid to the surface of the film about to be engaged by the supporting member, said liquid having a refractive index substantially equal to the refractive index of said film, whereby when the film is pressed against the transparent supporting member the intervening liquid provides optical contact between the film and its supporting member for passage through the light beam.

KENNETH C. D. HICKMAN.